July 31, 1956  J. D. PHILLIPS  2,756,829
FIRE EXTINGUISHER FOR TIRES
Filed March 30, 1954

INVENTOR.
BY *J.D. Phillips*
*Arthur H. Sturges*
Attorney

Уnited States Patent Office 2,756,829
Patented July 31, 1956

2,756,829

FIRE EXTINGUISHER FOR TIRES

John D. Phillips, Omaha, Nebr.

Application March 30, 1954, Serial No. 419,791

4 Claims. (Cl. 169—2)

This invention relates to appliances for motor vehicle trucks and trailers, and in particular fire extinguishing apparatus including a spear adapted to be projected through a side wall of a pneumatic tire and having flutes providing air channels in the sides thereof whereby with the spear extended through a side wall of a tire fire extinguishing fluid from a supply tank to which the spear is connected by a tube may be injected into the tire.

The purpose of this invention is to provide means for supplying fire extinguishing fluid to the interior of a motor vehicle tire when the tire begins to burn as the result of continued operation of the vehicle with the tire on a wheel thereof after the tire is partially deflated.

In a deflated or partially deflated pneumatic tire the side walls of the tire and inner tube are moving inwardly and outwardly continuously as the vehicle upon which the tire is mounted continues to operate and this rubbing action generates excessive heat. Heat generated by this internal friction builds up rapidly as the tire is a poor conductor of heat, or insulator, and consequently, the heat is intensified and the temperature reaches very high degrees. Applying water or other cooling fluids to the outside of the tire has very little effect, because of the insulating characteristics of the tire.

With this thought in mind this invention contemplates a device for extinguishing a fire in a motor vehicle tire in an emergency in which the device may be carried on a motor vehicle or trailer as standard equipment and is adapted to be used for instantly injecting fire extinguishing fluid into a burning tire.

The object of this invention is, therefore, to provide an appliance that is adapted to be used by a truck driver or the like whereby the device may be carried to a burning tire and fluid therein readily forced into the tire.

Another object of the invention is to provide a device for injecting fire extinguishing fluid into a burning tire in which the device is self-contained and does not require connections to power or pressure means of the vehicle.

Another important object of the invention is to provide an appliance for extinguishing fire in a motor vehicle tire in which the only part of the device that requires operation by the user is a valve and this may be opened by the thumb and forefinger of one hand.

A further object of the invention is to provide an appliance for injecting fire extinguishing fluid into a burning motor vehicle tire in which the injecting element of the device is adapted to be forced through the wall of the tire and tube therein by a foot of an operator.

A still further object of the invention is to provide an appliance for extinguishing fire in a tire of a motor vehicle in which the device is of a simple and economical construction.

With these and other objects and advantages in view the invention embodies a spear having flutes in the sides with the flutes leading from an opening in a head of the spear, and with the head of the spear connected by a tube and hose to a tank containing fire extinguishing fluid.

Other features and advantages of the invention will appear from the following description taken in connection with the drawings, wherein.

Figure 1:
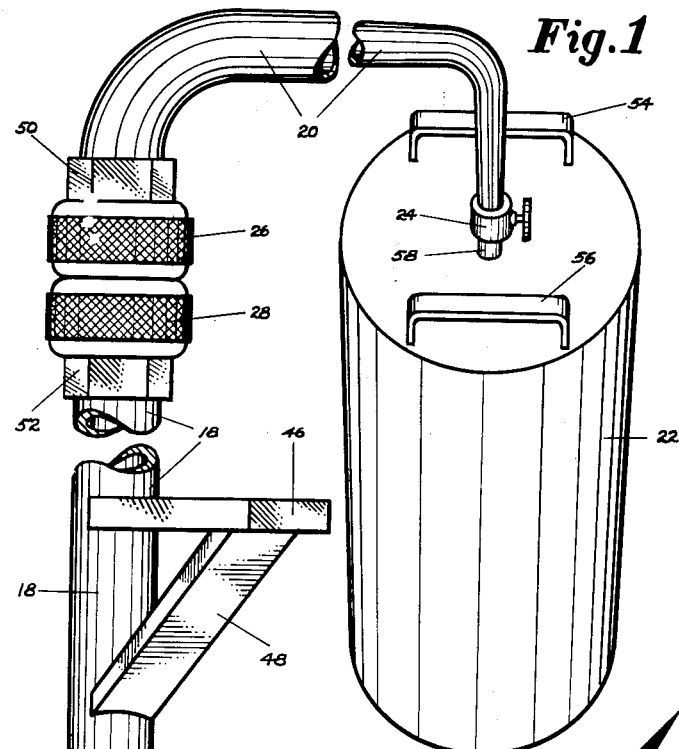
Figure 1 is a view illustrating the motor vehicle tire fire extinguishing appliance with parts broken away and shown in section and with a supply tank of the apparatus shown on a reduced scale.

While one embodiment of the invention is illustrated in the above referred to drawings, it is to be understood that they are merely for the purpose of illustration, and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a head of a spear having a point 14 and a tubular shank 16, numeral 18 a tube in which the upper end of the shank is mounted, numeral 20 a hose connecting the tube 18 to a tank 22, numeral 24 a valve in the hose 20, and numerals 26 and 28 parts of a union or coupling connecting the hose 20 to the tube 18.

Figure 2:
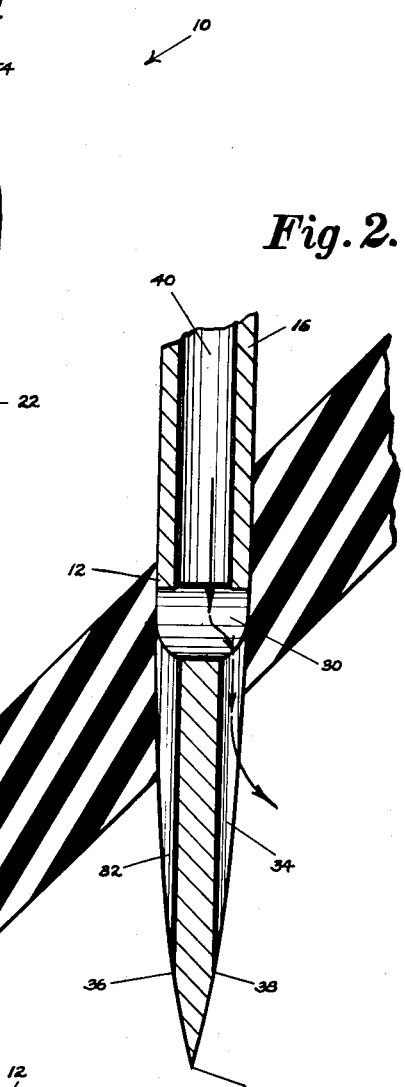
Figure 2 is a detail showing a longitudinal section through the spear of the device, said section being taken on line 2—2 of Figure 1, and the parts being shown on an enlarged scale.
Figure 3:
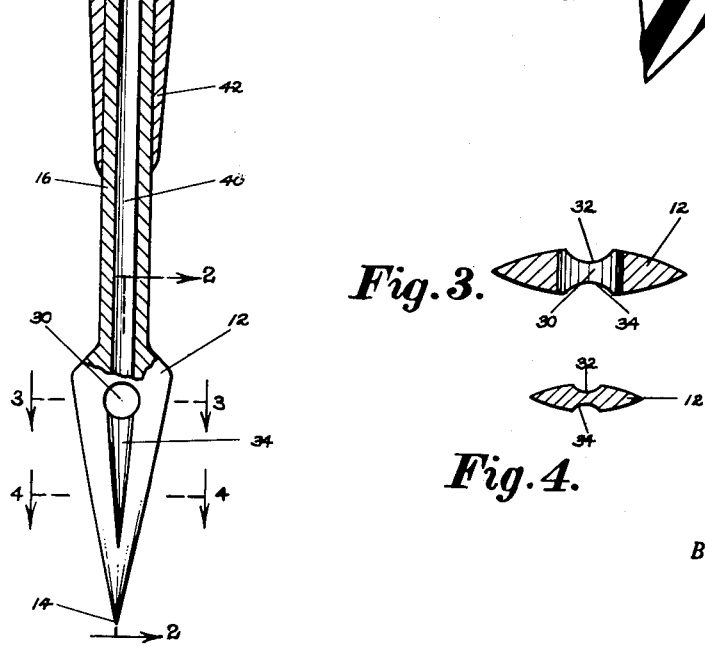
Figure 3 is a cross section through the point of the spear, said section taken on line 3—3 of Figure 1.
Figure 4:
Figure 4 is also a section through the point of the spear being taken on line 4—4 of Figure 1.

The head of the spear is provided with a transversely disposed passage 30 from the ends of which flutes 32 and 34 extend, and as shown in Figures 2 and 3, the flutes or channels, which are arcuate in cross section, extend from the passage 30 to points 36 and 38, respectively, that are spaced from the point 14. The passage 30 provides communicating means between the flutes 32 and 34 and an opening 40 which extends through the shank 16 and opens into the tube 18. The tube 18 is provided with a tapered lower end 42, and the shank 16 is secured in the tube with a set screw 44.

The tube 18 is also provided with a platform 46, which is preferably supported with a brace 48, and the platform is positioned whereby a foot may be placed thereon to force the point of the spear through the side wall and inner tube of a tire.

The parts 26 and 28 of the union or coupling member are provided with sleeves 50 and 52, respectively, by which the hose and tube are clamped in the coupling and, the outer surfaces of the sleeves are provided with flat sides to facilitate opening and closing the coupling with wrenches or the like.

The end of the tank 22 is provided with handles 54 and 56 and one end is provided with a nipple 58 upon which the valve 24, which is connected to the hose 20, is mounted.

With the parts assembled in this manner the spear is adapted to be forced through a side wall 60 of a motor vehicle tire and with the spear extended through the wall of the tire, as shown in Figure 2, the valve 24 is opened, and $CO_2$ or other fire extinguishing fluid, that may be contained under pressure in the tank 22, will pass through the hose, tube, and flutes, into the interior of the tire.

It will be understood that with modern trailer trucks which use many tires, and in most cases, dual tires, a tire loses pressure, such as by a puncture or other means, without warning the operator of the vehicle, and these soft, or partially deflated, or deflated tires continue to flat around generating heat until the high temperature starts the tire burning. At this time either the smoke or odor notifies the operator, and with the use of the appliance of this invention the operator may extinguish the fire and, at least save the vehicle upon which the tire is mounted.

From the foregoing specification it will become apparent that the invention disclosed will adequately accomplish the functions for which it has been designed and in an economical manner, and that its simplicity, accuracy, and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts, such as come within the purview of the invention claimed, may be resorted to in actual practice, if desired.

Having now described the invention that which is claimed to be new and desired to be procured by Letters Patent, is:

1. A fire extinguisher for use with motor vehicle tires comprising a spear having flutes in the sides and an opening in the head, a tank, a hose having a valve therein connecting the tank to the head of the spear, and a foot platform provided on the extinguisher whereby the spear is adapted to be forced by pressure of a foot on the platform through the wall of a tire, said opening in the head of the spear providing communicating means between the hose and flutes of the spear.

2. In a fire extinguishing appliance for use on motor vehicles, the combination which comprises a spear having a head positioned on the end of a tubular shank, said spear having air channels in sides thereof and said head having an opening therein providing communicating means between the interior of the shank and channels, a tube in which the shank of the spear is mounted, a foot platform on said tube, a fire extinguishing fluid tank, and a hose having a valve therein connecting the tank to said tube in which the shank of the spear is positioned.

3. In a motor vehicle tire fire extinguisher, the combination which comprises a spear having a head with a tubular shank extended upwardly therefrom and having a point on the lower end, said head having an opening therethrough and the sides of the point having flutes therein, the flutes being positioned to communicate with the opening through the head, a tube in which the tubular shank is secured, a foot platform positioned on a side of said tube, a hose, a coupling connecting one end of the hose to the upper end of the tube, a tank having handles thereon and a nipple extended therefrom, and a valve connecting the hose to the nipple of the tank.

4. A fire extinguisher comprising a hollow spear having a pointed head adapted to penetrate a motor vehicle tire, said head having longitudinally extending flutes in its sides, and means connecting said flutes with the hollow center of said spear, and means for supplying a fire extinguishing fluid to the interior of a tire through said spear.

References Cited in the file of this patent

UNITED STATES PATENTS

| | | |
|---|---|---|
| 1,644,290 | Titcomb et al. | Oct. 4, 1927 |
| 2,260,515 | Ensminger et al. | Oct. 28, 1941 |
| 2,506,126 | Williamson et al. | May 2, 1950 |